Feb. 7, 1933.  J. GLEN  1,896,357

SANDING DEVICE FOR AUTOMOBILES

Filed Oct. 19, 1931  3 Sheets-Sheet 1

INVENTOR.
JOHN GLEN
BY *Barnes & Kisselle*
ATTORNEYS.

Feb. 7, 1933.  J. GLEN  1,896,357
SANDING DEVICE FOR AUTOMOBILES
Filed Oct. 19, 1931  3 Sheets-Sheet 2
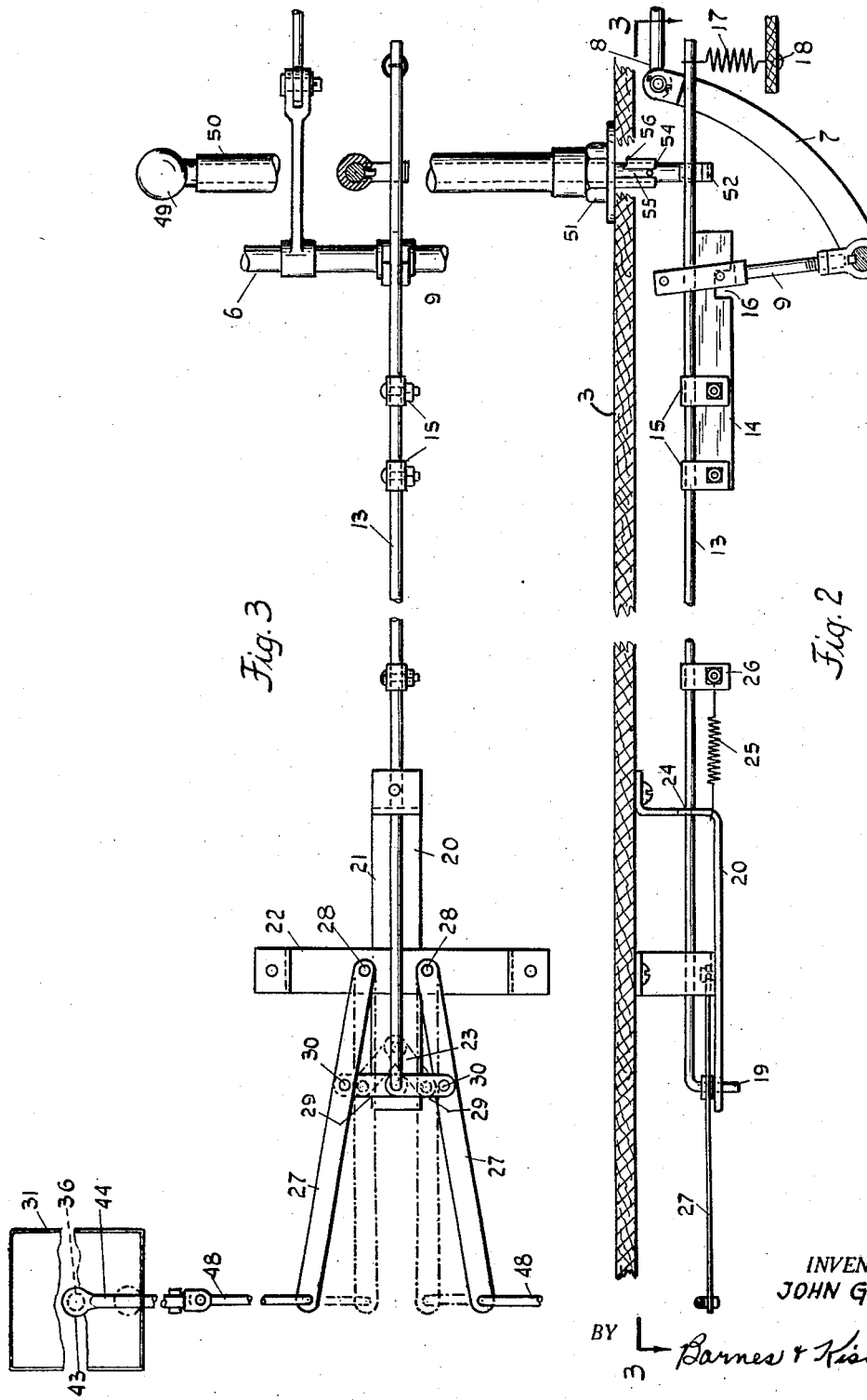
INVENTOR.
JOHN GLEN
BY 
ATTORNEYS Feb. 7, 1933. J. GLEN 1,896,357
SANDING DEVICE FOR AUTOMOBILES
Filed Oct. 19, 1931 3 Sheets-Sheet 3
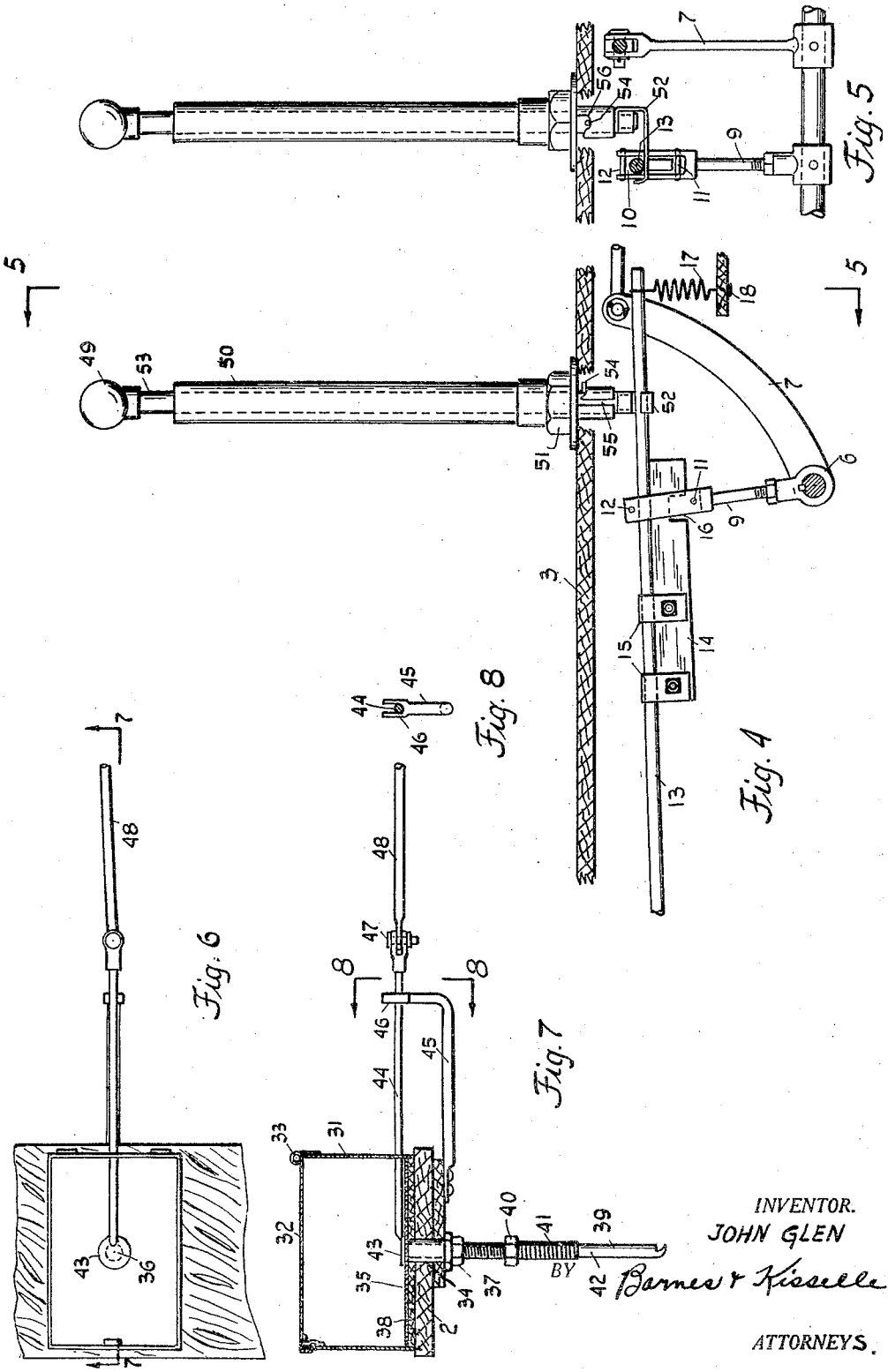
INVENTOR.
JOHN GLEN
BY Barnes & Kisselle
ATTORNEYS.

Patented Feb. 7, 1933

1,896,357

UNITED STATES PATENT OFFICE

JOHN GLEN, OF DETROIT, MICHIGAN

SANDING DEVICE FOR AUTOMOBILES

Application filed October 19, 1931. Serial No. 569,671.

This invention relates to a device for sprinkling sand or the like on the roadway. The particular embodiment which is described here is one which is adapted to sprinkle sand on the road in front of the braking wheels of a motor vehicle to prevent skidding when the brakes are applied, and to enable the vehicle to be started when it is being driven on a slippery pavement.

The object of this invention is to provide a device which can be operated automatically upon application of the brake pedal or disengaged at the will of the driver of the car so as not to operate at all. While this broad idea has been followed in previous patents, this invention provides a new and improved means of disengaging the sander which is more satisfactory and practicable than any yet devised. The invention also includes a new and improved mechanism for operating the valve of the sand container by pressing the foot brake pedal.

A further advantage which is found in this invention lies in the fact that the sander may be operated by pressing the foot brake, and it may then be held in operative position even though the brake is released so that the sander may be in operation as long as desired while the car is being driven forward.

In the drawings:

Figure 2 is a side view of the mechanism by which the device is operated.

Figure 3 is a top view of the mechanism along the line 3—3 of Figure 2.

Figure 4 is a detailed drawing showing the manner in which the sanding device is disengaged and locked in a disengaged position.

Figure 5 is a view along the line 5—5 of Figure 4.

Figure 6 is a top view of the sand container and valve control mechanism.

Figure 7 is a view along the line 7—7 of Figure 6.

Figure 8 is a view along the line 8—8 of Figure 7.

Figure 1:
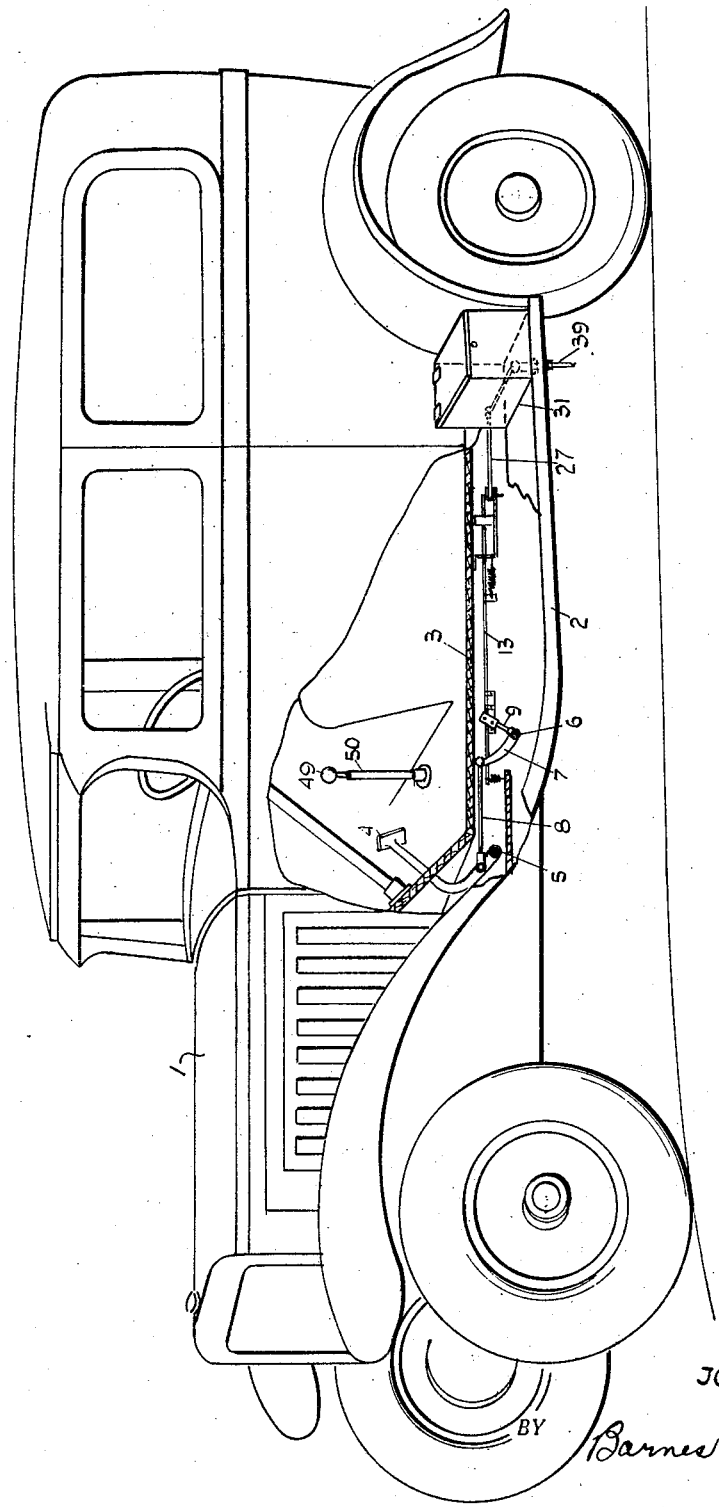
Figure 1 is a diagrammatic sketch of an automobile with a part cut away showing one manner of mounting the sanding device.

In the embodiment of the invention which is shown in the drawings, numeral 1 represents an automobile in which the sanding device has been installed. The running board of the car is shown at 2, the floor boards at 3, and the brake pedal at 4, mounted on the shaft 5. The rocker shaft 6 is positioned transversely of the car a short distance behind the shaft 5. Immovably fixed on the shaft 6 is the arm 7 which is connected to the brake pedal by means of the link 8. The lever 9 is immovably fixed to the shaft 6 preferably by clamping or by means of a key. Pressure on the brake pedal, therefor, causing a forward longitudinal movement of the link and a forward pivotal movement of the arm 7, results in a movement of the lever 9 through a short arc.

At its upper end, the lever 9 is formed with a longitudinal slot 10, at the lower and upper ends of which are positioned the transverse pins 11 and 12. The slot is of sufficient width to permit the rod 13 to move freely through it. The strip 14 is secured to the rod 13 with the edge of the strip adjacent to the rod, by means of U-shaped clips 15 which are bolted to the strip. In the lower edge of the strip close to the forward end is a notch 16 of sufficient size to engage the pin 11 of the lever 9. The rod 13 is normally held down by the spring 17 which is secured to an immovable part of the automobile at 18. Thus, when the notch 16 is held in engagement with the pin 11 by the spring, a movement of the lever 9 causes a longitudinal movement of the rod 13. At the other end of the rod is a downwardly extending portion 19 formed by simply bending the end of the rod at right angles to the main portion.

The bracket 20 is formed of two metal stampings 21 and 22 fixed together at right angles to each other, preferably by riveting. A longitudinal slot 23 is cut in the rear portion of the stamping 21 of sufficient width to receive the end 19 of the rod and sufficiently long to permit the rod to move in a longitudinal direction approximately one inch. In the vertical portion of the same stamping is a vertical slot 24 of the same width as the slot 23, and long enough to permit the rod to move in a vertical direction approximately one-half an inch. The spring 25 is secured at one end to the vertical portion of the stamping 21 and at the other to a U-shaped clip 26 which firmly grips the rod 13 due to the fact that the ends of the clip are bolted together. Two links 27 are pivotally secured at one end to the upper side of the horizontal portion of the stamping 22 by pins 28. Two connecting links 29 are pivotally secured at one end to the downwardly extending portion 19 of the rod; this is accomplished simply by fitting the end of the rod into a hole in each connecting link. At its other end each connecting link is pivotally secured to the links 27 by pins 30.

A sand container 31 is shown in the drawings in the form of a box. There are two such containers, one located on each running board immediately in front of the rear fender. These containers may be formed of sheet metal with a sheet metal cover 32 hinged at 33, and a base of wood covered with sheet metal. The threaded tube 34 is riveted to the sheet metal of the base. In the center of the wood portion of the base is a hole and concentric circular countersunk portion into which the tube is then fitted. The sheet metal base 35 of the container has a hole 36 which corresponds to the interior of the tube 34 in size and position. The sheet metal base 35 is then secured to the wood portion, preferably by nailing. The container is fixed to the running board by a nut 37 which is threaded on the tube 34. A flexible tube 39 is secured to the end of the tube 34 to conduct the sand close to the ground to prevent the wind from blowing it away. This tube consists of a nut 40 into which is partially threaded the spring 41 which has the tube 42 fitted into its lower end.

A circular disk 43 preferably made of sheet metal serves as a closure member for the hole 36. This disk is fixed to the rod 44 which extends outside the container, and is held in alignment by the guide 45, which is formed with a U-shaped end 46, as shown in Figure 8. The guide 45 is formed of a wooden portion and a rod having two portions at right angles to each other and is held in place by the nut 37. Secured to the outer end of the rod 44 by means of pin 47, is the connecting rod 48 to which the other end of the link 27 is secured. It will be obvious, of course, that the length of the various links and rods in this mechanism will have to be varied when it is to be installed in cars of different manufacture, but this in no way changes the principle of operation nor the essential features of the mechanism. Likewise, the device may be adapted to cars having but two wheel brakes as well as those which have four wheel brakes with but a few minor changes.

It can readily be seen from the foregoing description that a forward movement of the rod 13 will cause the two links 27 to be drawn together so that they will approximate a parallel position as shown in Figure 3 by dotted lines. This movement of the links causes a transverse movement of the connecting rod 48 and the valve rod 44. Thus, a pressure on the foot brake causes a forward movement of the rod 13 resulting in a movement of the closure member to the position shown by the dotted lines in Figure 3. Opening the valve and releasing the brake causes the motion of the links in this mechanism to be reversed and the valve to be closed.

The mechanism for disengaging the valve from the brake pedal will now be described. The lever 49 is positioned in the vertical casing 50, the latter having a flange 51 which is secured to the floor boards, preferably by screws. This lever is permitted a longitudinal movement within the casing of approximately one inch. At the lower end of the lever is threaded the flange 52 made of a stamping having a downwardly projecting portion and a horizontally extending portion, positioned to fit beneath the rod 13, as shown in Figures 2 and 4. When the lever 49 is in its lowest position, with the shoulder 53 in contact with the top of the casing 50, the flange 52 permits the rod 13 to be held in its normal position by the spring 17. In this position the notch 16 is in engagement with the pin 11. When the lever 49 is raised, the flange 52 raises the rod 13 and the notch 16 will no longer engage the pin 11. This position of the rod is shown in Figures 4 and 5. The effect of thus raising the rod 13 and withdrawing the notch and pin out of engagement with each other is that a movement of the foot brake pedal no longer causes a forward longitudinal movement of the rod 13.

The rod may be locked in this raised position in the following manner. Fixed to the lower end of the lever 49 is a radially extending lug 54 which is positioned within the vertical slot 55 formed in the lower end of the casing. At the upper end of this slot is a horiontally positioned recess 56, which is capable of receiving the lug 54 when the lever 49 is raised so that the lug reaches the entrance to the recess 56 and is moved into the recess by a slight rotation of the lever. The recess is approximately semi-circular in shape and will therefore not permit the lug to slide out of the recess without being raised.

The locking device is one of the most important features of this invention since it provides a method of locking the mechanism in a disengaged position. This method is important because it provides a simple manner of disengaging the sander during the summer months, or at any other time when the sander is not necessary.

From the foregoing description it may be seen that I have made several advances over the prior art. A new and simple mechanism is provided for converting the motion of a brake pedal or lever into the opening or closing of a valve. When this mechanism is adapted to be connected to a foot brake pedal, a simple and practical means is provided for disconnecting the mechanism when its operation is not desired. A simple device for locking the mechanism in this disconnected position and readily unlocking it again is the final advance.

What I claim is:

1. A sanding device for motor vehicles having in combination a shaft, a foot brake immovably mounted on said shaft, a second shaft, a lever fixed to said second shaft, means operatively connecting said foot brake and lever, a rod having a downwardly projecting portion and engaging the said lever, a bracket having a longitudinal slot, the said downwardly projecting portion of said rod fitting into said slot, a link pivotally secured to said bracket, a connecting link pivotally secured to said link and to said rod, a container adapted to hold sand having a hole in the bottom, a closure member for said hole, and means connecting the closure member and said link.

2. A sanding device for motor vehicles having in combination a shaft, a foot brake immovably mounted on said shaft, a second shaft, a lever fixed to said second shaft, means operatively connecting said foot brake and lever, a rod having a downwardly extending portion at one end and engaging the said lever at the other end, a bracket having a longitudinal slot, the said downwardly extending portion of said rod fitting into said slot, a link pivotally secured at one end to said bracket, a connecting link pivotally secured to said link at one end and to said rod at the other end, a container adapted to hold sand having a hole in the bottom, a closure member for said hole, and means connecting the closure member and said link.

3. A sanding device for motor vehicles having in combination a shaft, a foot brake immovably mounted on said shaft, a second shaft, a lever fixed to said second shaft, means operatively connecting said foot brake and lever, a rod having a downwardly projecting portion and engaging the said lever, a bracket having a longitudinal slot, the said downwardly projecting portion of said rod fitting into said slot, a link pivotally secured to said bracket, a connecting link pivotally secured to said link and to said rod, a container adapted to hold sand having a hole in the bottom, a closure member for said hole, and means connecting the closure member and said link, movement of said foot brake causing longitudinal movement of said rod which causes a transverse movement of the connecting means and the closure member.

4. A sanding device for motor vehicles having in combination a shaft, a foot brake immovably mounted on said shaft, a second shaft, a lever fixed to said second shaft, said lever having a longitudinal slot, means operatively connecting said foot brake and lever, a rod carrying a notched strip, the said notch engaging the said slot of the said lever, movement of the foot brake causing a longitudinal movement of the rod, a box adapted to hold sand having a hole in the bottom to permit sand to run out, a closure member extending outside the box, the said closure member being connected to said rod by motion translating means, a longitudinal movement of the rod causing a movement of the closure member, and means for lifting the notched strip out of engagement with the slot of the lever.

5. A sanding device for motor vehicles having in combination a shaft, a foot brake immovably mounted on said shaft, a second shaft, a lever fixed to said second shaft, said lever having a longitudinal slot, means operatively connecting said foot brake and lever, a rod carrying a notched strip, the said notch engaging the said slot of the said lever, movement of the foot brake causing a longitudinal movement of the rod, a box adapted to hold sand having a hole in the bottom to permit the sand to run out, a closure member extending outside the box, the said closure member being connected to said rod by motion translating means, a longitudinal movement of the rod causing a movement of the closure member, and a member capable of vertical movement having a flange at its lower end adapted to engage the rod, vertical movement of the member causing the said flange to raise the said rod out of engagement with the slot of said lever.

6. A sanding device for motor vehicles having in combination a shaft, a foot brake immovably mounted on said shaft, a second shaft, a lever fixed to said second shaft, said lever having a longitudinal slot, means operatively connecting said foot brake and lever, a rod carrying a notched strip, the said notch engaging the said slot of the said lever, movement of the foot brake causing a longitudinal movement of the rod, a box adapted to hold sand, having a hole in the bottom to permit the sand to run out, a closure member extending outside the box, the said closure member being connected to said rod by motion translating means, a longitudinal movement of the rod causing a movement of the closure member, means for moving the notched strip out of engagement with the slot of the lever, and means for locking the notched strip in disengaged position.

7. A sanding device for motor vehicles having in combination a shaft, a foot brake immovably mounted on said shaft, a second shaft, a lever fixed to said second shaft, said lever having a longitudinal slot, means operatively connecting said foot brake and lever, a rod carrying a notched strip, the said notch engaging the said slot of the said lever, movement of the foot brake causing a longitudinal movement of the rod, a box adapted to hold sand having a hole in the bottom to permit the sand to run out, a closure member extending outside the box, the said closure member being connected to said rod by motion translating means, a longitudinal movement of the rod causing a movement of the closure member, and a member capable of vertical movement having a flange at its lower end adapted to engage the rod, vertical movement of the member causing the said flange to raise the said rod out of engagement with the slot of said lever, and means for locking the notched strip in disengaged position.

8. A sanding device for motor vehicles having in combination a shaft, a foot brake immovably mounted on said shaft, a second shaft, a lever fixed to said second shaft, said lever having a longitudinal slot, means operatively connecting said foot brake and lever, a rod having secured to it a strip, said strip having a notch in its lower edge, the said notch engaging the said slot of the said lever, movement of the foot brake causing a longitudinal movement of the rod, a box adapted to hold sand having a hole in the bottom to permit the sand to run out, a closure member extending outside the box, the said closure member being connected to said rod by motion translating means, a longitudinal movement of the rod causing a movement of the closure member, and means for lifting the notched strip out of engagement with the slot of the lever.

In testimony whereof I affix my signature.

JOHN GLEN.